US011022234B2

(12) United States Patent
Wei et al.

(10) Patent No.: US 11,022,234 B2
(45) Date of Patent: Jun. 1, 2021

(54) AUTOMATICALLY RESETTABLE PRESS-TYPE SWITCHING VALVE AND BATHTUB FAUCET

(71) Applicant: XIAMEN SOLEX HIGH-TECH INDUSTRIES CO., LTD., Xiamen (CN)

(72) Inventors: Zhijian Wei, Xiamen (CN); Lihong Hu, Xiamen (CN); Fangqi Lin, Xiamen (CN); Tangjun Dan, Xiamen (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 191 days.

(21) Appl. No.: 16/159,981

(22) Filed: Oct. 15, 2018

(65) Prior Publication Data
US 2019/0249795 A1    Aug. 15, 2019

(30) Foreign Application Priority Data

Feb. 9, 2018 (CN) .......................... 201810134830.1

(51) Int. Cl.
*F16K 1/36* (2006.01)
*E03C 1/02* (2006.01)
(Continued)

(52) U.S. Cl.
CPC ................ *F16K 31/56* (2013.01); *E03C 1/01* (2013.01); *E03C 1/023* (2013.01); *F16K 1/36* (2013.01);
(Continued)

(58) Field of Classification Search
CPC ............... F16K 31/56; F16K 31/52408; F16K 31/52491; F16K 31/528; F16K 31/5288;
(Continued)

(56) References Cited

U.S. PATENT DOCUMENTS

| 4,337,790 A * | 7/1982 | Buchner | ........... F16K 31/52408 |
| | | | 137/550 |
| 2009/0146090 A1* | 6/2009 | Hashimoto | ....... F16K 31/52491 |
| | | | 251/25 |

(Continued)

FOREIGN PATENT DOCUMENTS

| CN | 2563390 Y | 7/2003 |
| CN | 202451936 U | 9/2012 |

(Continued)

OTHER PUBLICATIONS

The CN1OA dated Dec. 18, 2019 by the CNIPA.

*Primary Examiner* — Kelsey E Cary
(74) *Attorney, Agent, or Firm* — Qinghong Xu (57) ABSTRACT

An automatically resettable press-type switching valve includes a valve housing, an operating portion, a driven rod, a water blocking member, and a resetting member. The valve housing is formed therein with an inlet and outlet passages. A water blocking seat is provided between the inlet and outlet passages. The operating portion drives the driven rod to move axially so as to form a forward pressure difference or reverse pressure difference between two opposing sides of the water blocking member, by which the water blocking member is pushed to move axially with the driven rod. The resetting member is drivingly connected with the water blocking member, when there is no water pressure at a side of the inlet passage, the resetting member drives the water blocking member to separate from the water blocking seat, and the inlet passage is communicated with the outlet passage.

18 Claims, 8 Drawing Sheets

(51) Int. Cl.
  *F16K 31/56* (2006.01)
  *F16K 1/42* (2006.01)
  *E03C 1/01* (2006.01)
  *F16K 27/02* (2006.01)

(52) U.S. Cl.
  CPC ................ *F16K 1/42* (2013.01); *F16K 27/02* (2013.01); *E03C 2201/30* (2013.01)

(58) Field of Classification Search
  CPC ... F16K 31/38; F16K 1/36; F16K 1/42; F16K 1/32; F16K 27/02; E03C 1/01; E03C 1/023; E03C 1/042; E03C 2201/30
  See application file for complete search history.

(56) References Cited

U.S. PATENT DOCUMENTS

2016/0201303 A1\* 7/2016 Doss ................ F16K 31/52475
  4/668
2017/0067576 A1\* 3/2017 Jing ........................ F16K 17/34

FOREIGN PATENT DOCUMENTS

| CN | 102720861 A | 10/2012 |
| CN | 102777609 A | 11/2012 |
| CN | 203404385 U | 1/2014 |
| CN | 204573237 U | 8/2015 |
| CN | 107620814 A | 1/2018 |
| JP | 2014020457 A | 2/2014 |

\* cited by examiner

AUTOMATICALLY RESETTABLE PRESS-TYPE SWITCHING VALVE AND BATHTUB FAUCET

CROSS REFERENCE

This application is based upon and claims priority to Chinese Patent Application No. 201810134830.1, filed on Feb. 9, 2018, the entire contents thereof are incorporated herein by reference.

TECHNICAL FIELD

The disclosure relates to sanitary ware technology, in particular to an automatically resettable press-type switching valve and a water discharging device.

BACKGROUND

In the existing sanitary ware field, for example, a bathtub faucet that requires a large outlet flow is usually provided with a pull-type switching valve. It is necessary to lift the handle or depress the handle to control the opening or closing of the water path. Each time the faucet is opened, it is necessary to control the handle to arrive at a certain angle for a suitable water flow, and it is also necessary to reversely press down by the same angle when closing. If the handle is not rotated to position, there is a problem of water leakage in the switching valve. In addition, the handle of such a structure occupies a large space and is prone to be unexpectedly hit by the user, resulting in a high misoperation rate.

With the existing press-type switching valve structure, the closing and opening of the water path is realized by axially moved of a water-blocking member via pressing a transmission rod and automatic rebound of a resetting member, respectively. The resetting member typically acts directly on the transmission rod. The water blocking member realizes water blocking through water pressure based on a piloting principle. In the opening operation, the water blocking member is typically opened by water pressure. However, in the case of bathtub faucets with large water outflow, the water pressure is relatively low, resulting in a low pressure in the pilot pressure cavity, being manifested in untight water blocking. Or, the low water pressure may also cause a problem that the water blocking member may not be opened normally and a normal opening may not be performed.

It may be seen that for a water path with large water outflow, the pull-type switching valve has the problem of inconvenient operation, while the press-type switching valve has the problem of being unable to work normally.

SUMMARY

An embodiment of the present disclosure provides an automatically resettable press-type switching valve including a valve housing, an operating portion, a driven rod, and a water blocking member. An inlet passage and an outlet passage are formed in the valve housing. A water blocking seat is provided between the inlet passage and the outlet passage. With the operating portion, the driven rod is driven to move axially. The axial movement of the driven rod forms a forward or reverse pressure difference between the opposing sides of the water blocking member, by which the water blocking member is pushed to move axially with the driven rod. There is additionally a resetting member which is drivingly connected with the water blocking member. If there is no water pressure at the side of the inlet passage where the water blocking member is located, the resetting member drives the water blocking member to separate from the water blocking seat, and the inlet passage is communicated with the outlet passage.

According to an embodiment of the present disclosure, the driven rod includes at least one retainer which may abut against the water blocking member at at least one side, thereby driving the water blocking seat to block water. The driven rod may drive the water blocking member to cover and engage with the water blocking seat to cut off the communication of the inlet passage and the outlet passage.

According to an embodiment of the present disclosure, there is additionally a pressure chamber formed at one side of the water blocking member and communicated with the inlet passage. Water pressure formed in the pressure chamber acts on the water blocking member to keep it covered and engaged with the water blocking seat.

According to an embodiment of the present disclosure, the water blocking member is formed with an axial access hole which has one end communicated with the pressure chamber and another end communicated with the outlet passage. The driven rod is movably fitted in the access hole. The driven rod is provided with a first seal which, together with the driven rod, movably seals the access hole. When the driven rod resets away from the water blocking seat to release the water blocking member, the first seal disengages from the access hole, thereby releasing the pressure inside the pressure chamber.

According to an embodiment of the present disclosure, the driven rod is further provided with a second seal and a third seal. The middle portion of the driven rod is assembled to fit with the water blocking member. The second seal and the third seal are located at two sides of the water blocking member, respectively. The valve housing includes a first moving cavity and a second moving cavity. The driven rod and the second seal or the third seal are movable in a piston-like manner in the first or second moving cavity. The first moving cavity is communicated with the inlet passage. The water pressure in the inlet passage pushes the second seal to form a second balance force. The second moving cavity is communicated with the outlet passage. The water pressure in the outlet passage pushes the third water blocking member to form a third balance force which is in a direction opposite to the second balance force.

According to an embodiment of the present disclosure, the first seal of the driven rod is located between the driven rod and the water blocking member. The inlet passage is at one side of the first seal, and the outlet passage is at the other side of the first seal. In a blocked state of the water blocking member, the water pressure in the inlet passage pushes the first seal to form a first balance force which is in a direction opposite to that of the second balance force.

According to an embodiment of the present disclosure, the first moving cavity has one end communicated with the outlet passage, and another end communicated with the external space. The second seal separates the outlet passage from the external space to form the second balance force.

According to an embodiment of the present disclosure, there is further included a first fixing seat to form a pressure cavity facing the water blocking seat. The pressure cavity and the water blocking member jointly enclose the pressure chamber which is communicated with the inlet passage.

According to an embodiment of the present disclosure, there is further included a second fixing seat on which the water blocking seat is formed, and which is formed with a guiding cylinder facing the first fixing seat. The guiding cylinder is sealedly communicated with the pressure cavity of the first fixing seat, and together with the pressure cavity and the water blocking member, encloses the pressure chamber. Between the guiding cylinder and the water blocking seat there are provided a plurality of inlets.

According to an embodiment of the present disclosure, the water blocking member is movably sealed with the guiding cylinder via a fourth seal. The water blocking member is movable axially within the guiding cylinder to be switched to a blocked state or communicated state.

According to an embodiment of the present disclosure, the water blocking member is a water blocking diaphragm which fixes and seals at its periphery the pressure chamber. The water blocking diaphragm has a blocking path which is displaceable by deformation of the diaphragm, and thus to be switched to blocked state or communicated state.

According to an embodiment of the present disclosure, the operating portion is a button-type actuation mechanism including a button portion and a transmission portion. The transmission portion is connected with the button portion and the driven rod, respectively, and transforms a pressing action to an axial action so as to drive the driven rod to move axially.

According to an embodiment of the present disclosure, the transmission portion includes a transmission member and a cam. The transmission member has one end connected with the button portion, and another end connected with the cam. The pressing action of the transmission portion drives the cam to rotate in a first direction or a second direction. The cam is rotatably mounted on the valve housing, and includes an implementing portion offset from the rotation axis by which the driven rod is driven to move axially.

In another aspect of the present disclosure, there is provided a bathtub faucet including an automatically resettable press-type switching valve as mention above which is operated by a button-type operating portion.

BRIEF DESCRIPTION OF THE DRAWINGS

The various objectives, features, and advantages of the present disclosure will become more apparent from the following detailed description of preferred embodiments of the present disclosure in conjunction with the accompanying drawings. The drawings are merely exemplary illustration of the disclosure and are not necessarily drawn to scale. Through the drawings, the same reference numerals denote the same or similar components.

In the drawings.

LIST OF REFERENCE NUMBERS

1—valve housing; 11—inlet passage; 12—outlet passage; 13—cavity groove; 15—second moving cavity; 2—operating portion; 21—button portion; 22—spring; 2A—transmission portion; 23—fixing seat; 24—transmission member; 25—cam; 26—implementing portion; 3—driven rod; 30—retainer; 31—snap-fitting end; 32—first groove; 33—second groove; 34—third groove; 35—first seal; 36—second seal; 37—third seal; 4—water blocking member; 4A—pressure—forming seat; 40—concave; 41—access hole; 43—communicating port; 44—fourth seal; 45—blocking port; 451—guide bar; 46—fifth seal; 4B—diaphragm; 47—flexible member; 48—frame body; 49—resetting member; 5—pressure chamber; 6—first fixing seat; 61—pressure cavity; 62—first moving cavity; 63—first snap—fitting portion; 7—second fixing seat; 71—water blocking seat; 72—valve port; 73—guide cylinder; 74—second snap—fitting portion; 75—inlet; 8—water discharging device.

DETAILED DESCRIPTION

Now more full description will be made to the exemplary embodiments with reference to the accompanying drawings. However, the exemplary embodiments may be implemented in various forms and should not be construed as limited to the embodiments set forth herein. Instead, these embodiments are provided to render the present disclosure to be full and complete, and to fully convey the concept of the exemplary embodiments to those skilled in the art. The same reference numerals in the drawings denote the same or similar structures, and thus their detailed description will be omitted.

The inventor found that the main problem of the existing press-type switching valve is in that it is mainly the piloting principle that the water blocking member utilizes to cover and engage with the sealing valve port, that is to say, a water pressure is formed by the pressure cavity of the water blocking member facing away from the valve port to push the water blocking member for seal. In the opening operation of the valve port, the transmission rod is pushed away by the resetting member, so that the pressure cavity is depressurized via the outlet passage to form a pressure difference between the pressure cavity and the outside which pushes the water blocking member off the valve port. However, when the water pressure is low, the pressure difference between the inside and the outside of the pressure cavity is insufficient, resulting in that the water block is not tight or may not be opened.

One of the main objectives of the present disclosure is to overcome the problem that the conventional press-type switching valve may not work normally when it is applied to a water discharging device with large water outflow, and provide a press-type switching valve that may normally work with a water discharging device with large water outflow.

Another main objective of the present disclosure is to overcome the problem that the conventional press-type switching valve may not work normally when it is applied to a water discharging device with large water outflow, and provide a press-type bathtub faucet that may normally work with a water discharging device with large water outflow.

A further object of the present disclosure is to provide an automatically resettable press-type switching valve with a small resistance against press and a bathtub faucet to which the same is applied.

Accordingly, the inventor proposes that for the press-type switching valve of the water discharging device with large outflow, an press action may used to activate water blocking, and thereafter, even if the water pressure is low, it is enough to build the pressure difference between the inside and outside of the water blocking member. Here, the driven rod may be used as an implementer. A forward pressure difference is formed at the water blocking member, thereby completing sealing against the valve port by the water blocking member and solving the problem that a low pressure may not accomplish sealing. At the same time, a resetting member is provided to abut against the water blocking member at the side of the valve port. When the opening action is performed, the driven rod moves away from the water blocking member to release the pressure against the water blocking member at the side of the valve port, thereby forming a reverse pressure difference. In this case, the resetting member may push the water blocking member off the valve port to complete opening. In this way, the above technical problems may be solved, thereby realizing the application of a press-type switching valve in a water discharging device with large water outflow.

According to a specific embodiment, in the above expression "pressure difference" includes, but not limited to, water pressure difference between the inside and outside of the water blocking member, or the pressure directly acting on the water blocking member by the driven rod, or the pressure acting on the water blocking member by the resetting member. These pressures may be a resultant action in practical applications.

In addition, with the above technical solution when applied in, for example, a bathtub faucet, if there is not any water pressure in the inlet passage, the resetting member may push the water blocking member away from the valve port to complete the opening, and may automatically reset to the open state, just meeting the use requirements of bathtub faucets.

In order to manifest the inventor's above-mentioned technical ideas, an exemplary explanation will be made to the embodiments of the present disclosure below with reference to the accompanying drawings.

Figure 1:
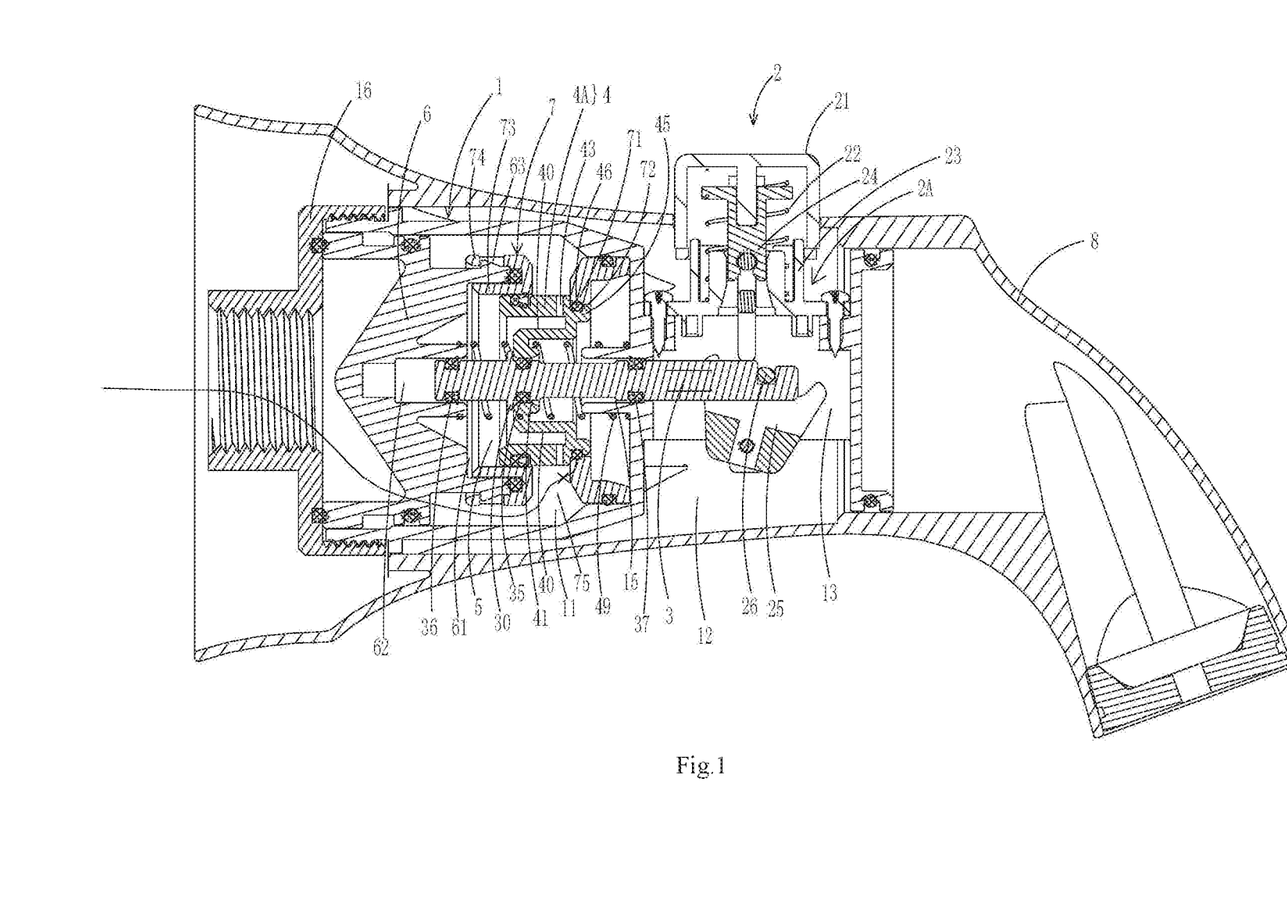
FIG. 1 is a schematic structural view of an automatically resettable switching valve according to a first embodiment.
Figure 2:
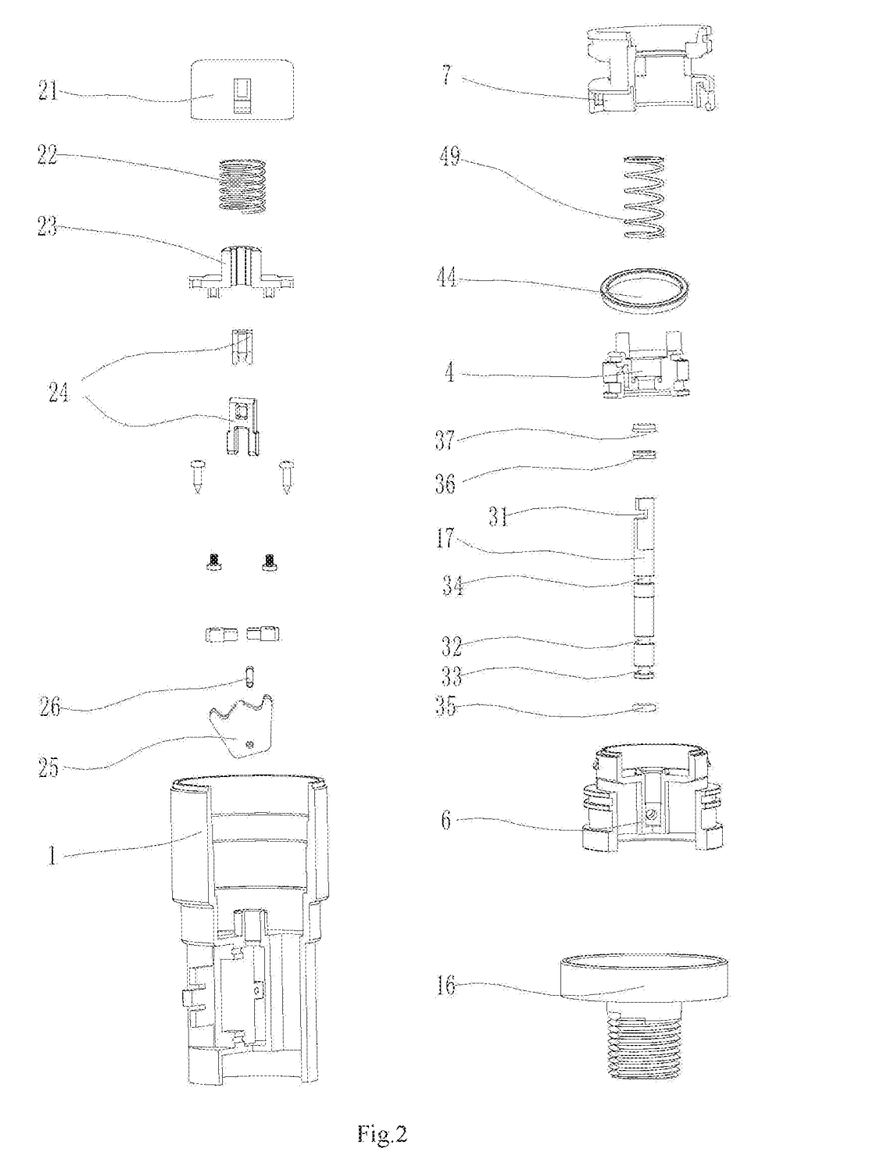
FIG. 2 is an exploded schematic view of the automatically resettable switching valve according to a first embodiment.
Figure 3:
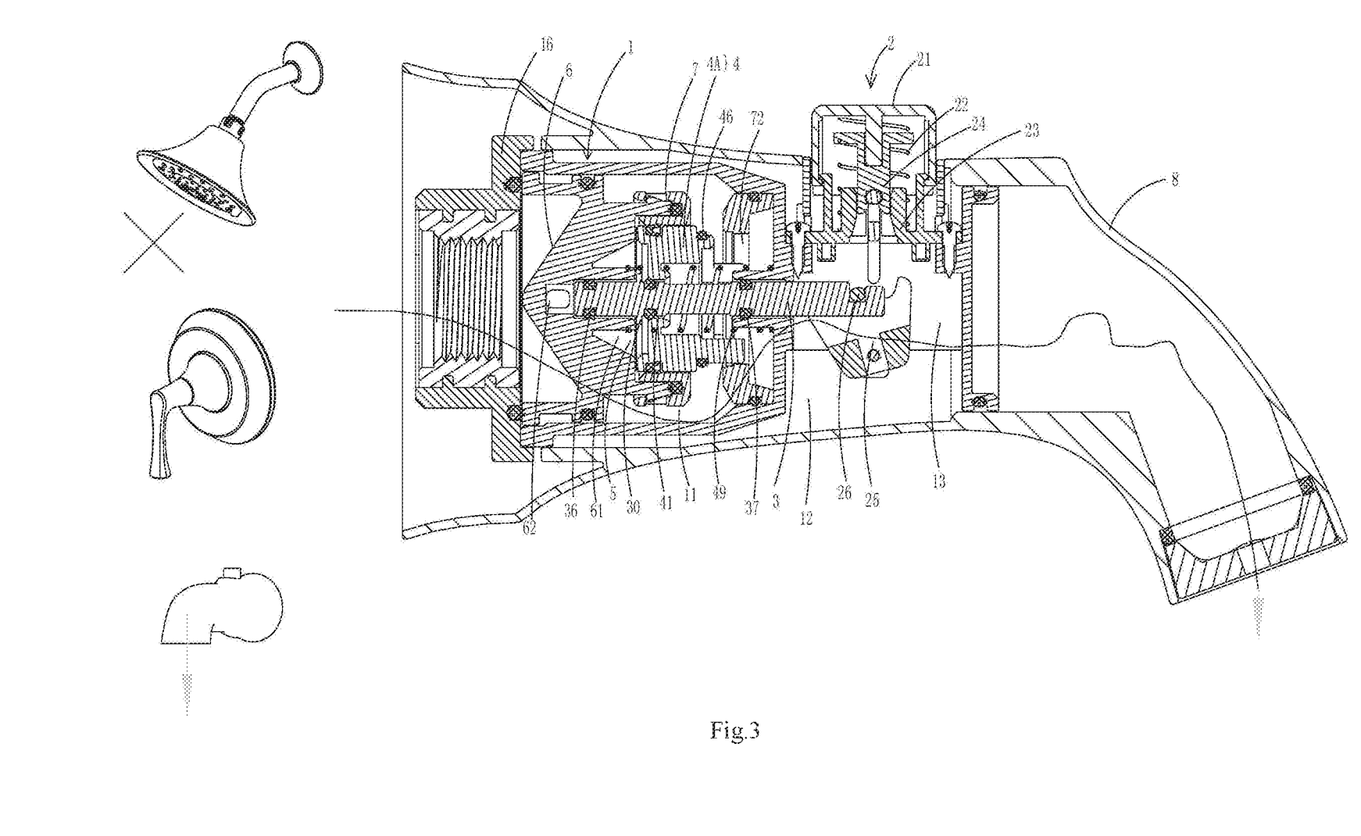
FIG. 3 is a schematic structural view of an automatically resettable switching valve in a water discharging mode according to a first embodiment.
Figure 4:
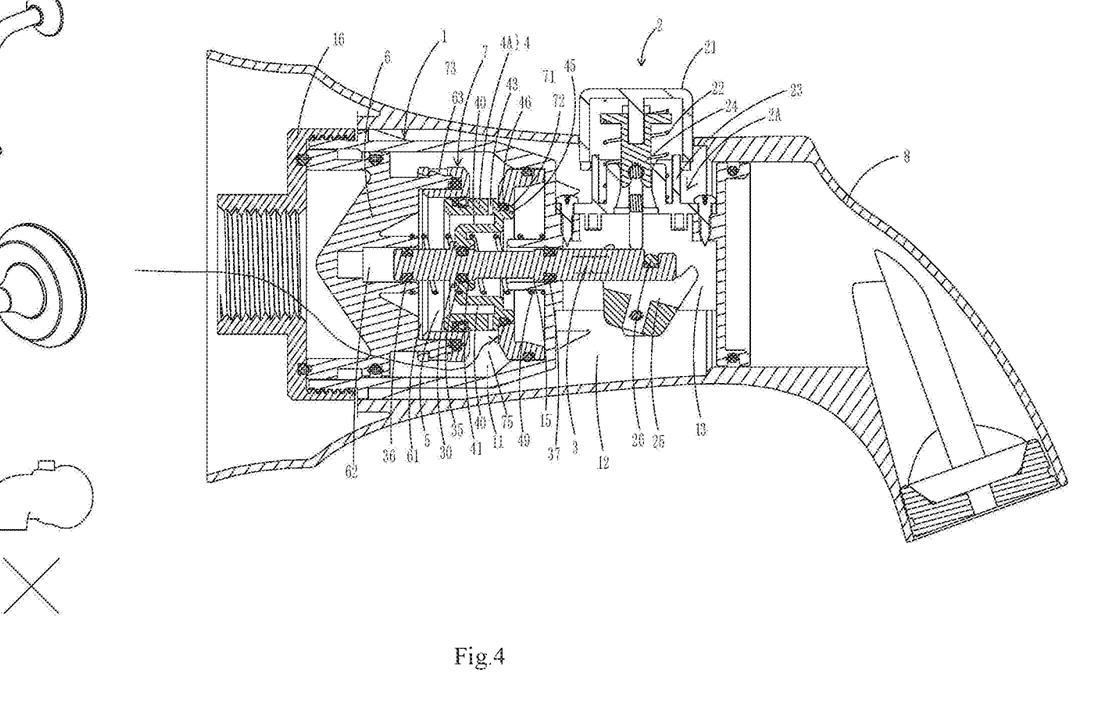
FIG. 4 is a schematic structural view of an automatically resettable switching valve in a water blocking mode according to a first embodiment.

FIG. 1 is a schematic structural view of an automatically resettable switching valve according to a first embodiment. FIG. 2 is an exploded schematic view of the automatically resettable switching valve according to a first embodiment. FIG. 3 is a schematic structural view of an automatically resettable switching valve in a water discharging mode according to a first embodiment. FIG. 4 is a schematic structural view of an automatically resettable switching valve in a water blocking mode according to a first embodiment.

As shown in the figures, this embodiment of the present disclosure provides an automatically resettable press-type switching valve of which the main acting components include a valve housing 1, an operating portion 2, a driven rod 3, and a water blocking member 4. The valve housing 1 may be formed therein with an inlet passage 11, an outlet passage 12 and a cavity groove 13. The inlet passage 11 and the outlet passage 12 are inner cavities of the water path of the valve housing 1. The cavity groove 13 is communicated with the outside and is separated from the water path. The cavity groove 13 is mainly used for assembling the operating portion 2. A water blocking seat 71 is optionally disposed between the inlet passage 11 and the outlet passage 12. The operating portion 2 receives the external pressing action, and then drives the driven rod 3 to move axially. The driven rod 3 may drive the water blocking member 4 to cover and engage with the water blocking seat 71 to break the communication between the inlet passage 11 and the outlet passage 12 to achieve water shutoff.

It should be understood by those skilled in the art that with this solution, the pilot pressure cavity may optionally no longer be provided, and the inlet passage may be regarded as providing the required pressure for blocking water. In addition, the technical solutions for accomplishing sealing or opening by the water blocking member 4 cooperating with the water blocking seat 71 may also have a variety of options, for example, the commonly used cooperation between a diaphragm structure and a valve port, or use of various flexible sealing plates with various valve port structures.

The driven rod 3 is optionally provided with a retainer 30 which is configured to abut against the water blocking member 4 on one side to drive the water blocking seat 71 to block the water. At the same time, a resetting member 49 is also provided to abut against the water blocking member 4. After the driven rod 3 has been reset and released the water blocking member 4, the inlet passage 11 releases pressure via the outlet passage, and the resetting member 49 may push the water blocking member 4 to release the water blocking seat 71. The inlet passage 11 and the outlet passage 12 are communicated with each other via the water blocking seat 71. It should be understood that the manner of the driven rod 3 being cooperated with the water blocking member 4 is not limited to the structure illustrated in the figures, and those skilled in the art should understand that there are many options for the structure type of the retainer 30 as long as it may push the water blocking member 4 in a direction away from the water blocking seat 71. For example, it is also an option that the water blocking member 4 may be pushed by a sealing ring inserted in the driven rod 3.

Of course, a pressure chamber 5 may also be optionally provided. The pressure chamber 5 is formed at the side of the water blocking member 4 facing away from the water blocking seat 71, and is communicated with the inlet passage 11 to form a water pressure in the pressure chamber 5 acting on the water blocking member 4. In this embodiment, the water blocking member 4 may be better kept covered and engaged with the water blocking seat 71. Regarding the pressure relief mechanism of the pressure chamber 5, one embodiment is to optionally form an axial access hole 41 in the water blocking member 4 which has one end communicated with the pressure chamber 5 and another end communicated with the outlet passage 12. The driven rod 3 is movably fitted in the access hole 41. The driven rod 3 is provided with a first seal 35, and movable seals the access hole 41 together with the first seal 35. When the rod 3 resets and releases the water blocking member 4 in the direction away from the water blocking seat 71, the first seal 35 comes out of the access hole 41, thereby releasing the pressure in the pressure chamber 5.

According to an embodiment of the present disclosure, the driven rod 3 is formed at one end thereof with a snap-fitting end 31 to be in transmission cooperation with the operating portion. In the driven rod 3 are formed a first groove 32, a second groove 33 and a third groove 34 spaced with each other. The first seal 35 is inserted in the first groove 32, and the second seal 36 and the third seal 37 are inserted in the second groove 33 and the third groove 34, respectively.

The second seal 36 and the third seal 37 are located at two sides of the water blocking member 4, respectively. The valve housing 1 may be correspondingly provided with a first moving cavity 62 and a second moving cavity 15. The driven rod 3 and the second seal 36 or the third seals 37 may make piston movement in the first moving cavity 62 or the second moving cavity 15. The first moving cavity 62 is communicated with the inlet passage 11 in which the water pressure presses the second seal 36 to form a second balance force. The second moving cavity 15 is communicated with the outlet passage 12 in which the water pressure presses the third seal 37 to form a third balance force. The second balance force is in a direction opposite to that of the third balance force. Accordingly, it is easy to keep the balance of the driven rod 3 in the water passing state without undesired displacement occurred due to the water pressure difference. At the same time, the resistance caused by the water pressure difference when the driven rod 3 is operated is eliminated as much as possible. More specifically, one end of the second moving cavity 15 is communicated with the outlet passage 12 and the other end is communicated with a cavity groove 13. The second seal 36 partitions the outlet passage 12 and the cavity groove 13, thereby forming a second balance force. Since the cavity 13 is communicated with the external space, the second balancing force is the pressure difference between the water pressure in the water path and the atmospheric pressure, and a large balancing force may be formed.

In a more specific embodiment, the second seal 36 and the third seal 37 are selected as Y-shaped sealing rings with their openings both facing the water blocking member 4 so as to provide a better sealing effect and at the same time provide a greater pressure difference for balance.

Specifically, the first seal 35 of the driven rod 3 is located between the driven rod 3 and the water blocking member 4. At one side of the first seal 35 is the inlet passage 11, and at the other side is the outlet passage 12. In the blocked state of the water blocking member 4, the water pressure in the inlet passage 11 presses the first seal 35 to form a first balance force which is in a direction opposite to that of the second balance force. Accordingly, the driven rod 3 is kept balanced in the water shut-off state without undesired displacement occurred due to the water pressure difference. At the same time, the resistance caused by the water pressure difference when the driven rod 3 is operated is eliminated as much as possible.

As shown in the figures, in the structure of a specific example, the outer end of the inlet passage 11 of the valve housing 1 may be optionally screwed to a connecting base 16 to facilitate connection with the external water path through the connecting base 16. The valve housing 1 may be further optionally provided therein with a first fixing seat 6 and a second fixing seat 7. The first fixing seat 6 may be provided with two sealing structures corresponding to the connecting base 16 and the inner sidewall of the valve housing 1, respectively, so as to seal the connection interface between the connecting base 16 and the valve housing 1.

The first fixing seat 6 is also formed with a pressure cavity 61 facing in the direction of the water blocking seat 71. Optionally, the pressure cavity 61 and the water blocking member 4 together enclose the pressure chamber 5 which is communicated with the inlet passage. The first fixing seat 6 may also be formed with a moving cavity 62 facing the water blocking member 4 which is communicated with the pressure chamber 5.

The aforesaid water blocking seat 71 is formed on the second fixing seat 7. The second fixing seat 7 is further formed with a guide cylinder 73 facing the first fixing seat 6. The guide cylinder 73 may be sealedly connected to the pressure cavity 61 of the first fixing seat 6 through a structure such as a seal ring. Optionally, the pressure cavity 61 may be provided at the outside with one or more first snap-fitting portions 63, corresponding to which the guide cylinder 73 is provided at the outside with one or more second snap-fitting portions 74. The first snap-fitting portion 63 and the second snap-fitting portion 74 may be fixed by snap-fit, with a sealing ring clamped therebetween. In this way, the pressure cavity 61, the guide cylinder 73 and the water blocking member 4 may enclose the pressure chamber 5. The second fixing seat 7 is provided with a plurality of water inlets 75 at positions between the guide cylinder 73 and the water blocking seat 71. As shown in the figures, in the structure of a specific example, the water blocking seat 71 is formed with a valve port 72. A sealing ring may also be arranged between the second fixing seat 7 and the inner wall of the valve housing 1 for sealing to prevent the inlet passage 11 from leaking into the outlet passage 12 through the second fixing seat 7.

In the specific embodiment shown in the figures, the water blocking member 4 may be optionally in form of a pressure seat 4A of a cap-like structure with an opening facing the pressure chamber 5. The pressure seat 4A may be optionally an integrally formed plastic member. Specifically, the pressure seat 4A may also be recessed facing the pressure chamber 5 to form an recess 40, in an end face of which the access hole 41 is provided. The inside of the recess 40 may define a fitting cavity facing in the direction of the water blocking seat 71. One end of the resetting member 49 may abut against the fitting cavity, and the other end of the resetting member 49 may abut against the valve housing 1. The resetting member 49 may be optionally the one such as a spring having a function of storing energy when being pressed and resetting when being released. According to the specific embodiment of the present disclosure, since the pressure seat 4A is a separate component and has a fixed outer shape, it may has an outer diameter which is at least larger than ½ of the inner diameter of the valve housing 1, and even is the same as the inner diameter to the largest. Since the relative area of the pressure seat 4A may be larger, the water pressure difference formed thereby may be more significant, providing unique technical advantages when being applied to a water discharging device with large outflow.

The outer side of the water blocking member 4 may be movably sealed with the guide cylinder 73 through a fourth seal 44. The water blocking member 4 is movable axially in the guide cylinder 73 to be switched to a blocked state or a communicated state. The outer wall of the water blocking member 4 is also provided with a plurality of water holes 43 corresponding to the positions of the inlet openings 75 of the second fixing seat 7 so that the inlet passage 11 may be communicated with the pressure chamber 5 through the water holes 43. According to a specific embodiment of the present disclosure, in the case where the access hole 41 is opened, the inflow rate formed by the combination of the plurality of water holes 43 of the water blocking member 4 is smaller than the outflow rate of the access hole 41 so that when the driven rod 3 and the first seal 35 move away from the access hole 41, the pressure chamber 5 is depressurized by the flow rate difference to form a reverse pressure difference. When the driven rod 3 and the first seal 35 are close to the access hole 41 or sealed in the access hole 41, since the inflow rate formed by the combination of the water holes 43 is greater than the outflow rate of the access hole 41, the pressure in the pressure chamber 5 will be raised, thereby forming a forward pressure difference, to push the water blocking member 4 to seal the valve port 72.

The water blocking member 4 is further provided protrudingly with a water blocking port 45 facing the valve port 72. The water blocking port 45 may be substantially in the form of a bottle neck with the smaller diameter portion configured to be inserted inside the valve port 72 and the larger diameter portion configured to be pressed against the valve port 72 for positioning. Furthermore, a fifth seal 46 is disposed between the water blocking port 45 and the valve port 72 for sealing. As shown in FIG. 2, the water blocking member 4 may further be provided with a guide bar 451 to perform guide when the water blocking member 4 is moved axially with respect to the valve port 72, so as to prevent the pressure seat from deviating during operation of the pressure seat to cause poor seal.

The operating portion 2 is a button-type actuation mechanism which has many types available for selection in the art. One type is taken as an example in this embodiment. As shown in FIG. 2, the operating portion mainly includes a button portion 21 and a transmission portion 2A. The transmission portion 2A is connected with the button portion 21 and the driven rod 33, respectively, and transforms a pressing action to an axial action so as to drive the driven rod 3 to move axially.

Specifically, the button portion 21 may be fixed on the valve housing 1 through the fixing seat 23. At the same time, a spring 22 may be provided between the button portion 21 and the fixing seat 23 for resetting. The transmission portion 2A may include a transmission member 24 and a cam 25. The transmission member 24 may be a linkage mechanism composed of a push rod and a swing rod. The transmission member 24 is connected at one end to the button portion 21, and at the other end to the cam 25. The pressing action of the transmission portion 2A drives the cam 25 to rotate in the first direction or in the second direction. The cam 25 is rotatably mounted on the valve housing 1, and includes an implementing portion 26 offset from the rotating axis which drives the driven rod 3 to move axially. The implementing portion 26 may be specifically a driving pin to be snap-fitted with a groove in the snap-fitting end 31 of the driven rod 3 to drive the driven rod 3 to move axially. It should be understood that, between the implementing portion 26 and the driven rod 3, a rack transmission mechanism may be selected for transmission. It should be understood by those skilled in the art that a variety of existing axial transmission ways may be considered for application to the above-described embodiments of the present disclosure, for another example, worm transmission and the like.

As shown in FIGS. 1 to 4, the above-mentioned automatically resettable press-type switching valve may be installed in a bathtub faucet 8. The bathtub faucet 8 is provided with a corresponding mounting and fixing position, and preformed with an assembly hole for the operating portion 2.

To sum up, the first embodiment of the present disclosure may also be considered to provide a pressure seat 4A on which three seals and at least one water hole 43 are provided. The first seal is used for seal against the driven rod 3 and acts as a pressure relief hole. The second seal seals against the first fixing seat for water blocking. The third seal seals against the second fixing seat. In this way, the water may enter from the water hole 43 of the pressure seat 4A, with a principle same as that of the flexible water blocking diaphragm. In this solution, the pressure seat 4A has a structure of plastic parts, with an advantage in price. Moreover, an integrated structure instead of the existing flexible water blocking diaphragm allows the size of the sealing member of the pressure seat to be larger than that of the flexible water blocking diaphragm such that it is easier for seal by such a structure with an automatic reset at a low pressure. In addition, a structure larger than the second fixing seat is designed at the seal for sealing the pressure seat 4A and the second fixing seat, such that the pressure seat 4A is not pressed into the second fixing seat at a high pressure resulting in failure of the product.

It should be understood that in the embodiment of the present disclosure, the pressure seat 4A is different from the end face sealing manner of the water blocking member of diaphragm type, in that the pressure seat 4A is provided with a seal for water blocking at the outer periphery, forming an axial seal between the seal seat 71. At the same time, the water hole, which was typically provided in the end face, is instead provided at the side of the pressure seat 4A. In this way, in the switching valve of the same volume, the seal size may be enlarged by more than 1.5 times, so that a sufficient pressure may be formed to press against the pressure seat 4A to ensure the sealing effect at low pressure. At the same time, with the pressure seat 4A of the present embodiment, the use of diaphragm-type seals with a relatively complicated structure may be eliminated, and the manufacture and assembly are more convenient.

In the first embodiment of the present disclosure, a driven rod 3 is proposed with three seal grooves designed for seals. As shown in FIG. 3, when the bathtub discharges water, i.e., when the water is opened, the two Y-rings on the left and right sides of the driven rod 3 have the same force-bearing area, so the driven rod 3 is not subjected to force, and the water pressure balance effect is achieved. As shown in FIG. 4, when the top spray discharges water, i.e., when the water is closed, the right-hand Y-ring of the driven rod 3 and the middle seal have the same force-bearing area, so the driven rod 3 is not subjected to force, and the water pressure is also balanced. In this case, there is a stopper structure designed to be larger than the pressure seat in the middle of the driven rod 3, which is configured to drive the pressure seat so as to seal the upper fixing seat against the spring force, thereby achieving sealing. This method solves the problem that the water pressure may not overcome the spring force at low pressure.

Figure 5:
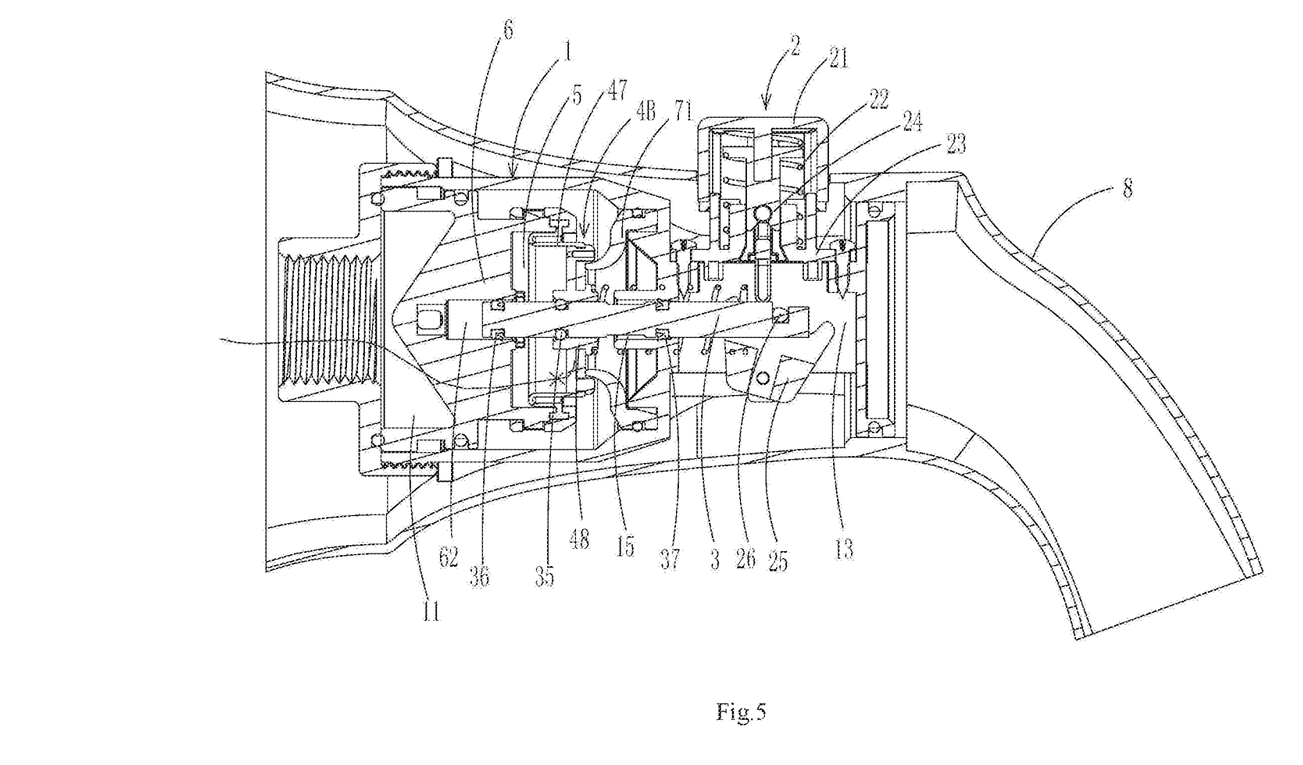
FIG. 5 is a schematic structural view of an automatically resettable switching valve according to a second embodiment.
Figure 6:
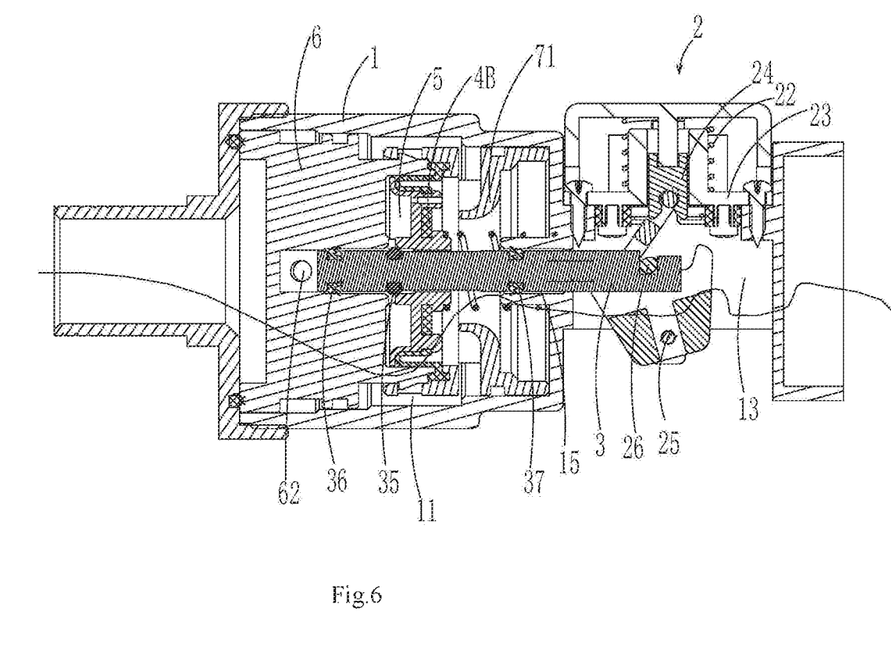
FIG. 6 is a schematic structural view of an automatically resettable switching valve in a water discharging mode according to a second embodiment.
Figure 7:
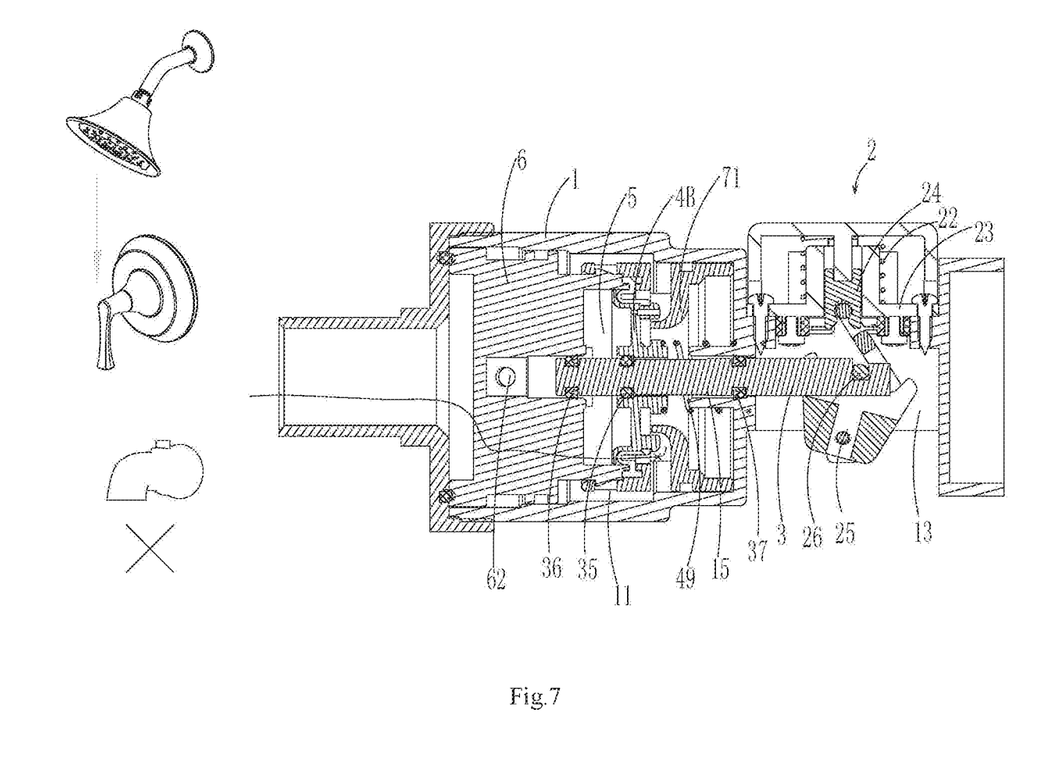
FIG. 7 is a schematic structural view of an automatically resettable switching valve in a water blocking mode according to a second embodiment.

FIG. 5 is a schematic structural view of an automatically resettable switching valve according to a second embodiment. FIG. 6 is a schematic structural view of an automatically resettable switching valve in a water discharging mode according to a second embodiment. FIG. 7 is a schematic structural view of an automatically resettable switching valve in a water blocking mode according to a second embodiment.

As shown in FIG. 5 to FIG. 7, a second embodiment of the present disclosure provides an automatically resettable press-type switching valve of which the main acting components include a valve housing 1, an operating portion 2, a driven rod 3, and a water blocking member 4. The valve housing 1 may be formed therein with an inlet passage 11, an outlet passage 12 and a cavity groove 13. The inlet passage 11 and the outlet passage 12 are inner cavities of the water path of the valve housing 1. The cavity groove 13 is communicated with the outside and is separated from the water path. The cavity groove 13 is mainly used for assembling the operating portion 2. A water blocking seat 71 is optionally disposed between the inlet passage 11 and the outlet passage 12. The operating portion 2 receives the external pressing action, and then drives the driven rod 3 to move axially. The driven rod 3 may drive the water blocking member 4 to cover and engage with the water blocking seat 71 to break the communication between the inlet passage 11 and the outlet passage 12 to achieve water shutoff.

It should be understood by those skilled in the art that with this solution, the pilot pressure cavity may optionally no longer be provided, and the inlet passage may be regarded as providing the required pressure for blocking water. In addition, the technical solutions for accomplishing sealing or opening by the water blocking member 4 cooperating with the water blocking seat 71 may also have a variety of options, for example, the commonly used cooperation between a diaphragm structure and a valve port, or use of various flexible sealing plates with various valve port structures.

The driven rod 3 is optionally provided with a first seal 35 which is configured to abut against the water blocking member 4 at one side so as to drive the water blocking seat 71 for blocking water. At the same time, a resetting member 49 is also provided to abut against the water blocking member 4. After the driven rod 3 has been reset and released the water blocking member 4, the inlet passage 11 releases pressure via the outlet passage, and the resetting member 49 may push the water blocking member 4 to release the water blocking seat 71. The inlet passage 11 and the outlet passage 12 are communicated with each other via the water blocking seat 71. It should be understood that the manner of the driven rod 3 being cooperated with the water blocking member 4 is not limited to the structure illustrated in the figures, and those skilled in the art should understand that there are many options for the structure type of the retainer 30 as long as it may push the water blocking member 4 in a direction away from the water blocking seat 71, which options should all fall within the technical scope as disclosed by the present disclosure.

The main difference between the automatically resettable press-type switching valve according to the second embodiment of the present disclosure and the first embodiment lies in that the water blocking member 4 is a flexible water blocking diaphragm 4B which includes a flexible member 47 and a frame body 48. The flexible member 47 and the frame body 48 are fixed by insertion. The frame body 48 defines the access hole 41 and the inlet. The flexible member 47 has an outer end fixedly connected to the first fixing seat 6, and thus is fixedly connected with the first fixing seat 6 to enclose the pressure chamber 5 together therewith. Specifically, the flexible member 47 may be fixed to the first fixing seat 6 through a snap-fitting seat.

Figure 8:
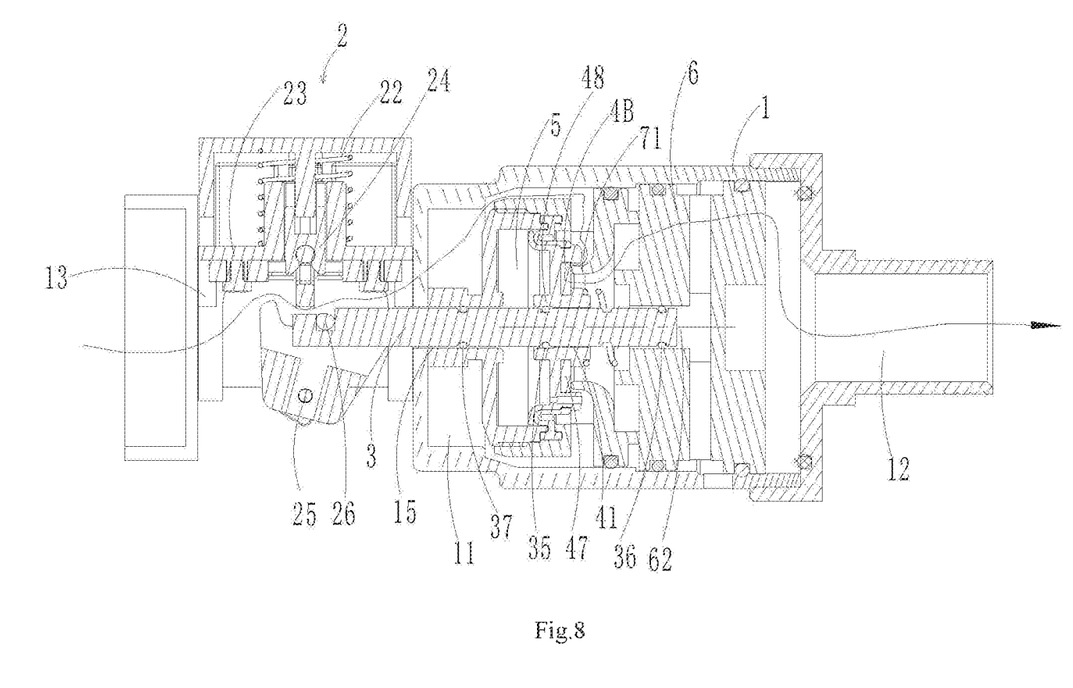
FIG. 8 is a schematic structural view of an automatically resettable switching valve according to a third embodiment.

FIG. 8 is a schematic structural view of an automatically resettable press-type switching valve according to a third embodiment.

As shown in FIG. 8, the third embodiment of the present disclosure provides a automatically resettable press-type switching valve of which the main acting components include a valve housing 1, an operating portion 2, a driven rod 3, and a water blocking member 4. The valve housing 1 may be formed therein with an inlet passage 11, an outlet passage 12 and a cavity groove 13. The inlet passage 11 and the outlet passage 12 are inner cavities of the water path of the valve housing 1. The cavity groove 13 is communicated with the outside and is separated from the water path. The cavity groove 13 is mainly used for assembling the operating portion 2. A water blocking seat 71 is optionally disposed between the inlet passage 11 and the outlet passage 12. The operating portion 2 receives the external pressing action, and then drives the driven rod 3 to move axially. The driven rod 3 may drive the water blocking member 4 to cover and engage with the water blocking seat 71 to break the communication between the inlet passage 11 and the outlet passage 12 to achieve water shutoff.

The main difference between the automatically resettable press-type switching valve according to the third embodiment of the present disclosure and the second embodiment is that the flexible water blocking diaphragm 4B is reversely installed, with the water flow path in the communicated state as indicated by the arrow in the figure. The diaphragm 4B includes a flexible member 47 and a frame body 48. The flexible member 47 and the frame body 48 are fixed by insertion. The frame body 48 defines the access hole 41 and the inlet. The flexible member 47 has an outer end fixedly connected to the first fixing seat 6, and thus is fixedly connected with the first fixing seat 6 to enclose the pressure chamber 5 together therewith. Specifically, the flexible member 47 may be fixed to the first fixing seat 6 through a snap-fitting seat.

The press-type switching valve provided by the embodiments of the present disclosure, compared with the conventional technology, has advantages in that:

In the embodiment of the present disclosure, the resetting member and the water blocking member are contacted, instead of the previous manner in which a spring acts on the transmission rod, solving the problem of failing to seal with low pressure, and also the problems of failing to open with low pressure. When the water is turned on, the water pressure and the pressure of the resetting member both have their direction configured to open the water blocking member, and the value of the pressing force at this time is only the friction force of the water blocking member. When the water is shut off, the contact area between the pressure seat and the second fixing seat is large, and the spring is easily overcome by the water pressure so as to get a good seal.

Of course, once the above description of representative embodiments is carefully considered, those skilled in the art will readily understand that many modifications, additions, substitutions, deletions, and other changes may be made to these specific embodiments, and these changes are within the scope of the inventive concept. Accordingly, the foregoing detailed description is to be clearly understood as being given by way of illustration and example only, and the spirit and scope of the present disclosure is limited solely by the append claims and their equivalents.

What is claimed is:

1. An automatically resettable press-type switching valve, comprising a valve housing, an operating portion, a driven rod, a water blocking member, and a resetting member, wherein:

the valve housing is formed therein with an inlet passage and an outlet passage, a water blocking seat is provided between the inlet passage and the outlet passage, the operating portion drives the driven rod to move axially, the axial movement of the driven rod forms a forward pressure difference or reverse pressure difference between two opposing sides of the water blocking member, by which the water blocking member is pushed to move axially with the driven rod;

the resetting member is drivingly connected with the water blocking member, when there is no water pressure at a side of the inlet passage where the water blocking member is located, the resetting member drives the water blocking member to separate from the water blocking seat, and the inlet passage is communicated with the outlet passage, wherein the driven rod is further provided with a second seal and a third seal, the driven rod has a middle portion configured to be assembled to fit with the water blocking member, the second seal and the third seal are located at two sides of the water blocking member, respectively, the valve housing comprises a first moving cavity and a second moving cavity, the driven rod and the second seal or the third seal are configured to perform piston movement in the first or second moving cavity, the first moving cavity is communicated with the inlet passage, a water pressure in the inlet passage pushes the second seal to form a second balance force, the second moving cavity is communicated with the outlet passage, a water pressure in the outlet passage pushes the third water blocking member to form a third balance force which is in a direction opposite to that of the second balance force.

2. The automatically resettable press-type switching valve according to claim 1, wherein the driven rod comprises at least one retainer which is configured to abut against the water blocking member at least one side, thereby driving the water blocking member to block water, the driven rod is configured to drive the water blocking member to cover and engage with the water blocking seat to cut off the communication of the inlet passage and the outlet passage.

3. The automatically resettable press-type switching valve according to claim 2, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

4. The automatically resettable press-type switching valve according to claim 1, further comprises a pressure chamber formed at one side of the water blocking member and communicated with the inlet passage, a water pressure formed in the pressure chamber acts on the water blocking member to keep it covered and engaged with the water blocking seat.

5. The automatically resettable press-type switching valve according to claim 4, wherein the water blocking member is formed with an axial access hole which has one end communicated with the pressure chamber and another end communicated with the outlet passage, the driven rod is movably fitted in the access hole, the driven rod is provided with a first seal which, together with the driven rod, movably seals the access hole, when the driven rod resets away from the water blocking seat to release the water blocking member, the first seal disengages from the access hole, thereby releasing the pressure inside the pressure chamber.

6. The automatically resettable press-type switching valve according to claim 5, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

7. The automatically resettable press-type switching valve according to claim 4, further comprising a first fixing seat to form a pressure cavity facing the water blocking seat, wherein the pressure cavity and the water blocking member jointly enclose the pressure chamber which is communicated with the inlet passage.

8. The automatically resettable press-type switching valve according to claim 7, further comprising a second fixing seat on which the water blocking seat is formed, and which is formed with a guiding cylinder facing the first fixing seat, wherein the guiding cylinder is sealedly communicated with the pressure cavity of the first fixing seat, and together with the pressure cavity and the water blocking member, encloses the pressure chamber, there are a plurality of inlets provided between the guiding cylinder and the water blocking seat.

9. The automatically resettable press-type switching valve according to claim 8, wherein the water blocking member is movably sealed with the guiding cylinder via a fourth seal, the water blocking member is movable axially within the guiding cylinder to be switched to a blocked state or communicated state.

10. The automatically resettable press-type switching valve according to claim 7, wherein the water blocking member is a water blocking diaphragm which has periphery fixing and sealing the pressure chamber, the water blocking diaphragm has a blocking path which is displaceable by deformation of the diaphragm, and thus to be switched to a blocked state or communicated state.

11. The automatically resettable press-type switching valve according to claim 4, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

12. The automatically resettable press-type switching valve according to claim 1, wherein the first seal of the driven rod is located between the driven rod and the water blocking member, the inlet passage is at one side of the first seal, and the outlet passage is at the other side of the first seal, in a blocked state of the water blocking member, the water pressure in the inlet passage pushes the first seal to form a first balance force which is in an direction opposite to that of the second balance force.

13. The automatically resettable press-type switching valve according to claim 12, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

14. The automatically resettable press-type switching valve according to claim 1, wherein the first moving cavity has one end communicated with the outlet passage, and another end communicated with an external space, the second seal separates the outlet passage from the external space to form the second balance force.

15. The automatically resettable press-type switching valve according to claim 14, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

16. The automatically resettable press-type switching valve according to claim 1, wherein the operating portion is a button-type actuation mechanism comprising a button portion and a transmission portion, the transmission portion is connected with the button portion and the driven rod, respectively, and transforms a pressing action to an axial action so as to drive the driven rod to move axially.

17. The automatically resettable press-type switching valve according to claim 16, wherein the transmission portion comprises a transmission member and a cam, the transmission member has one end connected with the button portion, and another end connected with the cam, pressing action of the transmission portion drives the cam to rotate in a first direction or a second direction, the cam is rotatably mounted on the valve housing, and comprises an implementing portion offset from a rotation axis by which the driven rod is driven to move axially.

18. A bathtub faucet comprising an automatically resettable press-type switching valve according to claim 1 which is operated by a button-type operating portion.

* * * * *